(12) United States Patent
Fujimura (10) Patent No.: US 7,372,504 B2
(45) Date of Patent: May 13, 2008

(54) CAMERA WITH VIDEO CAPTURING BUTTON AND STILL CAPTURING BUTTON CAPABLE OF SIMULTANEOUS OPERATION

(75) Inventor: Yuichi Fujimura, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 750 days.

(21) Appl. No.: 10/839,124

(22) Filed: May 6, 2004

(65) Prior Publication Data

US 2004/0239801 A1 Dec. 2, 2004

(30) Foreign Application Priority Data

May 29, 2003 (JP) .............................. 2003-152546

(51) Int. Cl.
*H04N 5/225* (2006.01)
(52) U.S. Cl. .................................... 348/376; 348/231.8
(58) Field of Classification Search ............. 348/220.1, 348/373, 376
See application file for complete search history.

(56) References Cited

U.S. PATENT DOCUMENTS 6,229,953 B1 * 5/2001 Ejima et al. .................. 386/96

FOREIGN PATENT DOCUMENTS

JP 63261336 A * 10/1988
JP 05-313247 A 11/1993

* cited by examiner

*Primary Examiner*—Ngoc-Yen Vu
*Assistant Examiner*—James A Meyers
(74) *Attorney, Agent, or Firm*—Sughrue Mion, PLLC (57) ABSTRACT

One of first and second picture-taking operating devices is placed in a rear surface of a camera body, while the other of the picture-taking operating devices is placed in a front surface of the camera body. An operator can selectively use the two picture-taking operating devices and can therefore be prevented from erroneously operating the operating devices. Each of the picture-taking operating devices is provided so that its operating direction is parallel to the optical axis of a picture-taking lens. Therefore, camera shake due to an operating force can be reduced. When the first picture-taking operating device is operated, picture data on a subject is recorded on a first recording medium. When the second picture-taking operating device is operated, picture data on the same subject is recorded on a second recording medium. The two picture-taking operating devices are selectively used to distribute picture data to the corresponding recording mediums.

1 Claim, 6 Drawing Sheets

CAMERA WITH VIDEO CAPTURING BUTTON AND STILL CAPTURING BUTTON CAPABLE OF SIMULTANEOUS OPERATION

BACKGROUND OF THE INVENTION

1. Field of the Invention

The present invention relates to a camera and, more particularly, to a camera having a plurality of picture-taking operating devices operated to input instructions to perform different picture-taking operations.

2. Description of the Related Art

In conventional cameras having a moving-picture-taking button depressed to take a moving picture and a still-picture-taking button depressed to take a still picture, each of these picture-taking buttons is ordinarily provided in a rear surface which faces an operator holding the camera during picture taking or in a side surface to be depressed sideways by the right or left hand of an operator holding the camera during picture taking.

A camera has also been proposed which has a picture-taking button for vertical-position picture taking to be depressed when the camera is vertically held and a picture-taking button for horizontal-position picture taking to be depressed when the camera is horizontally held, and in which only the horizontal-position picture taking button can be operated when an operator horizontally holds the camera (Japanese Patent Application Publication No. 5-313247). In ordinary cases, such picture-taking buttons are placed so that an operating force is applied in a direction approximately perpendicular to the optical axis of the picture-taking lens.

SUMMARY OF THE INVENTION

Ordinarily, an operator continues gazing on a subject through a finder. Also, an operator operating a camera having a moving-picture-taking button and a still-picture-taking button may wish to take a picture according to his/her intention by freely selecting between moving picture taking and still picture taking. With the conventional camera having both of two picture-taking buttons provided in a rear (or side) surface, however, there is a problem described below. An operator may depress the picture-taking button other than that preferable according to his/her intention when excessively concentrating on a subject through a finder. There is a possibility of picture taking being performed differently from one's intention by such an erroneous operation. The possibility of such an erroneous operation is high in the case of use of a camera having a moving-picture-taking button and a still-picture-taking button placed close to each other in a miniaturization design.

Even in a case where an operator depresses a picture-taking button according to his/her intention, camera shake may be caused by the operating force when the picture-taking button is operated and failure to correctly perform picture taking according to the intention may result. Also, an operator may fail to perform picture taking according to his/her intention, for example, recording of a moving picture for a desired time period in a case where a recording medium becomes full of data after taking a number of frames of still image at a resolution higher than that of the moving picture.

In view of the above-described circumstances, an object of the present invention is to provide a camera having a plurality of picture-taking operating devices and capable of preventing an erroneous operation of the plurality of picture-taking operating devices and performing picture taking according to an intention of an operator.

In a first aspect of the present invention, there is provided a camera having a picture-taking lens for photographing a subject, and a first picture-taking operating device and a second picture-taking operating device operated to input instructions to perform different picture-taking operations, wherein the first picture-taking operating device is placed in a rear surface of a camera body, the second picture-taking operating device is placed in a front surface of the camera body, and each of the first and second picture-taking operating devices is provided so that its operating direction is parallel to the optical axis of the picture-taking lens.

According to the first aspect of the present invention, the first picture-taking operating device and the second picture-taking operating device are respectively provided in the front and rear surfaces of the camera body. Therefore, the operator can easily use selectively the first picture-taking operating device and the second picture-taking operating device, and occurrence of an erroneous operation can be prevented. Also, since the direction in which each operating device is operated is parallel to the optical axis of the picture-taking lens, camera shake caused by the operating force applied to the first picture-taking operating device or the second picture-taking operating device is minimized and picture taking can be correctly performed according to an operator's intention.

According to a second aspect of the present invention, the first and second picture-taking operating devices provided in such a manner that, for example, one of the first and second picture-taking operating devices is a moving-picture-taking button depressed at the time of moving picture taking, the other of the first and second picture-taking operating devices is a still-picture-taking button depressed at the time of still picture taking, and the direction in which each button is depressed is parallel to the optical axis of the picture-taking lens.

According to a third aspect of the present invention, when in the camera in the second aspect of the invention both the moving-picture-taking button and the still-picture-taking button are operated to be simultaneously in the on states, moving picture data obtained by photographing the subject is recording on a predetermined recording medium with priority over still picture data.

In a fourth aspect of the present invention, there is provided a camera including a picture-taking lens for photographing a subject, a first picture-taking operating device and a second picture-taking operating device operated to input instructions to perform different picture-taking operations, the first picture-taking operating device being placed in a rear surface of a camera body, the second picture-taking operating device being placed in a front surface of the camera body, and a control device which records picture data obtained by photographing the subject on a predetermined first recording medium when the first picture-taking operating device is operated, and records picture data obtained by photographing the subject on a predetermined second recording medium different from the first recording medium when the second picture-taking operating device is operated.

According to the fourth aspect of the present invention, the first picture-taking operating device and the second picture-taking operating device are respectively provided in the front and rear surfaces of the camera body. Therefore, the operator can easily use selectively the first picture-taking operating device and the second picture-taking operating device, and occurrence of an erroneous operation can be prevented. Also, picture data is distributed to the recording mediums respectively corresponding to the picture-taking operating devices according to an operator's intention.

According to a fifth aspect of the present invention, when in the camera in the fourth aspect of the invention both the first and second picture-taking operating devices are operated to be simultaneously in the on states, groups of picture data on the same subject are simultaneously recorded on the first and second recording mediums.

According to a sixth aspect of the present invention, in the camera in the fourth or fifth aspect of the invention, one of the first and second picture-taking operating devices is a moving-picture-taking button depressed at the time of moving picture taking, while the other of the first and second picture-taking operating devices is a still-picture-taking button depressed at the time of still picture taking. Also in this camera, when the still-picture-taking button is operated during recording of moving picture data performed by operating the moving-picture-taking button, the control device records still picture data on the subject on one of the recording mediums while continuing recording of moving picture data on the same subject on the other of the recording mediums.

This arrangement ensures that still picture data can be recorded on another recording medium without causing a discontinuity in moving picture data.

According to the present invention, as described above, in a camera having a plurality of picture-taking operating devices, occurrence of an erroneous operation of any of the picture-taking operating devices can be prevented and picture taking can be correctly performed according to an operator's intention.

DETAILED DESCRIPTION OF THE PREFERRED EMBODIMENTS

Preferred embodiments of the present invention will be described with reference to the accompanying drawings.

First Embodiment

Figure 1A:
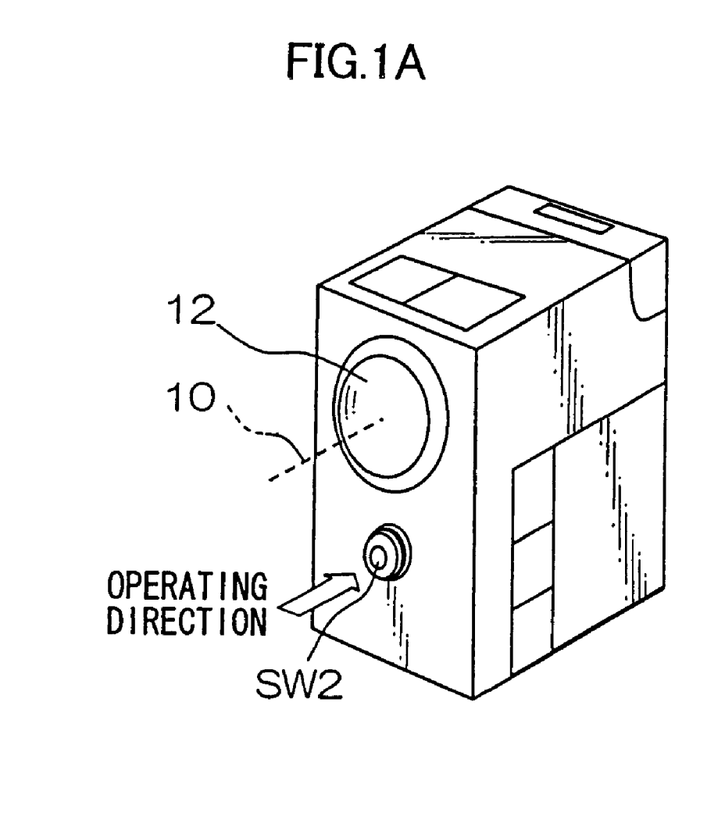
FIG. 1A is a front perspective view of a camera which represents a first embodiment of the present invention.
Figure 1B:
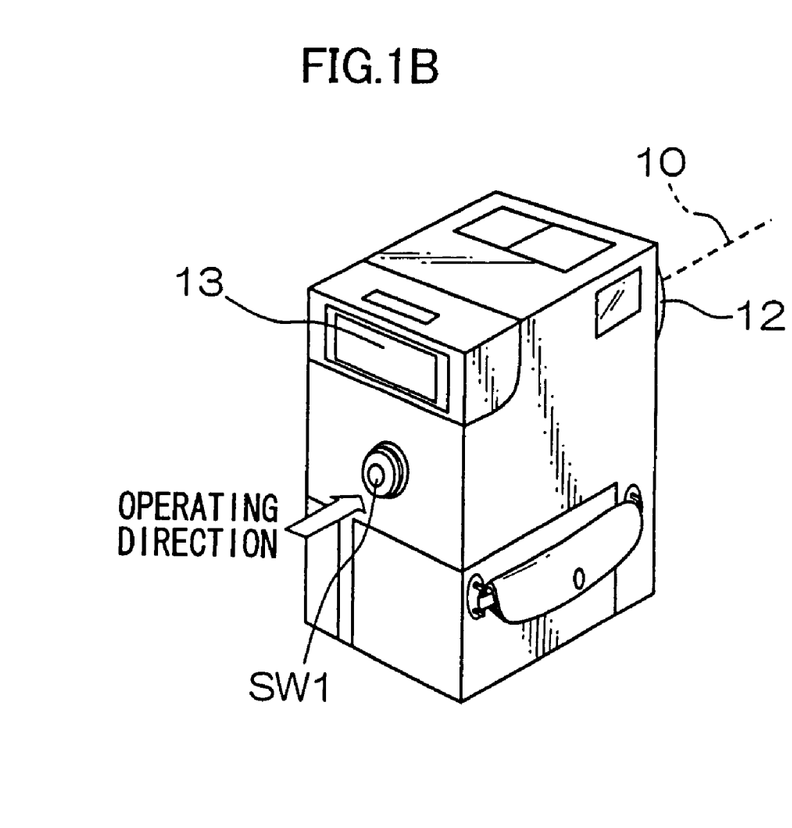
FIG. 1B is a rear perspective view of the camera according to the first embodiment of the present invention.

FIG. 1A is a front perspective view of a camera which represents a first embodiment of the present invention, and FIG. 1B is a rear perspective view of the camera.

A moving-picture-taking button SW1, which is a button depressed at the time of moving picture taking, is provided in a rear surface of a camera body so that the operating direction (the direction in which the button is depressed) is parallel to an optical axis 10 of a picture-taking lens 12. When an operator holds the camera with the picture-taking lens 12 directed toward a subject, the moving-picture-taking button SW1 faces in a direction toward the operator (opposite from the picture-taking direction) and is depressed in a direction toward the subject (picture-taking direction) by the operator. In this embodiment, the moving-picture-taking button SW1 is changed from an off state to an on state when depressed one time and is changed from the on state to the off state when again depressed.

A still-picture-taking button SW2, which is a button depressed at the time of still picture taking, is provided in a front surface of the camera body so that the operating direction (the direction in which the button is depressed) is parallel to the optical axis 10 of the picture-taking lens 12. When the operator holds the camera with the picture-taking lens 12 directed toward a subject, the still-picture-taking button SW2 faces in the picture-taking direction (opposite from the direction toward the operator) and is depressed in the direction toward the operator (the direction opposite from the picture-taking direction) by the operator. In this embodiment, the still-picture-taking button SW2 is turned on when depressed and is turned off when released from the depressed state.

A finder 13 through which the operator grasps which portion of a subject or which area including a subject will be imaged is provided in the rear surface of the camera body. When the operator holds the camera with the picture-taking lens 12 directed toward a subject, the finder 13 faces in the direction toward the operator (opposite from the picture-taking direction) and displays the subject in a predetermined window.

Figure 2:
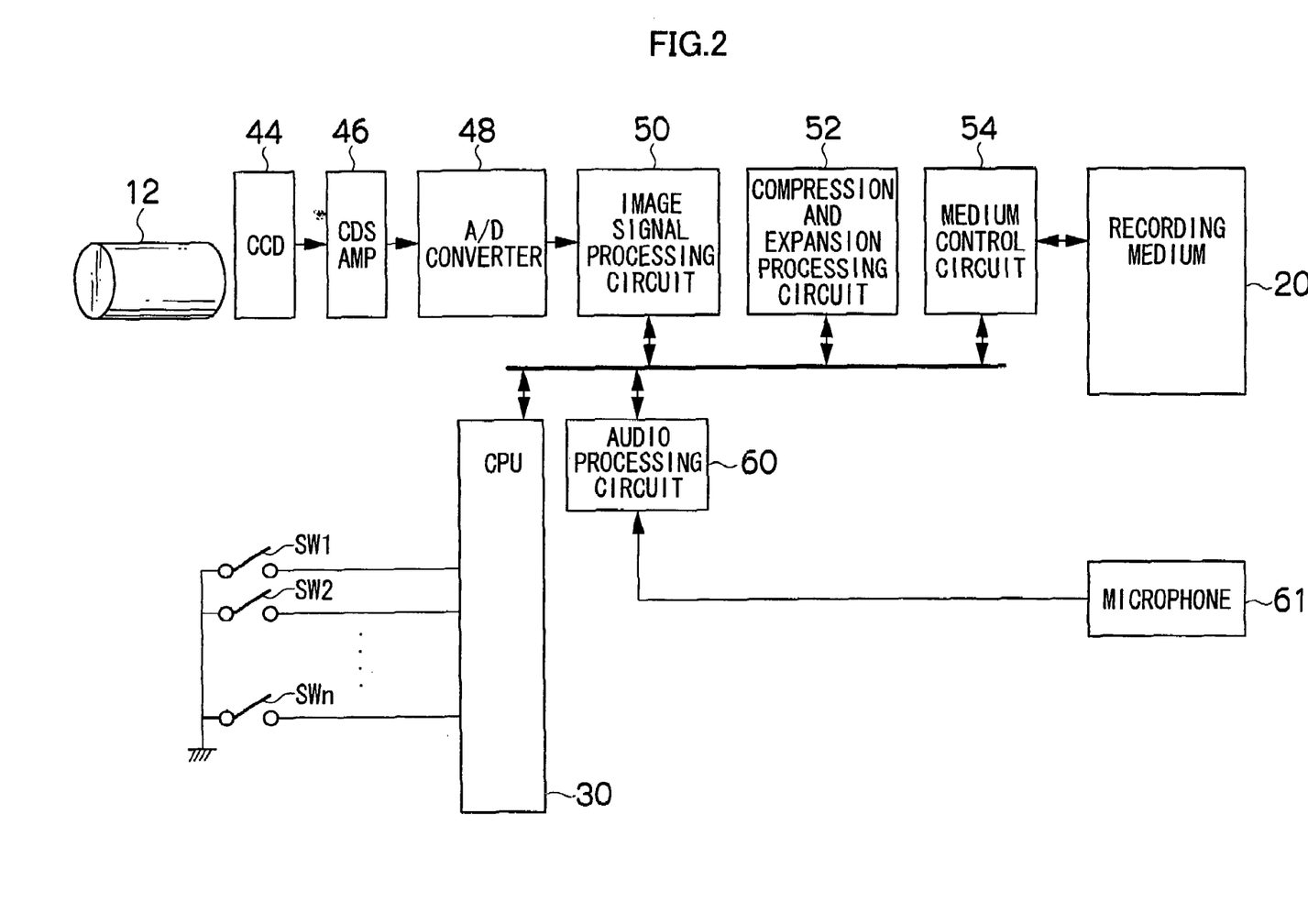
FIG. 2 is a block diagram showing essential portions of the internal configuration of the camera according to the first embodiment of the present invention.

FIG. 2 is a block diagram showing essential portions of the internal configuration of the camera in the first embodiment of the present invention.

On a recording medium 20, images and sounds are recorded. In this embodiment, a memory card detachable from the camera is used as recording medium 20.

A central processing unit (CPU) 30 performs overall control on circuits of the camera on the basis of inputs from the moving-picture-taking button SW1, the still-picture-taking button SW2, and other switches SWn.

When the moving-picture-taking button SW1 is depressed one time, the CPU 30 starts moving-picture-taking processing. When the moving-picture-taking button SW1 is again depressed, the CPU 30 stops moving-picture-taking processing. In moving-picture-taking processing, exposure control is performed, a subject is imaged on a solid image pickup device (CCD) 44 through the picture-taking lens 12, and picture data obtained during the time period from at which the moving-picture-taking button SW1 is depressed one time to the time at which the button SW1 is again depressed is continuously recorded as moving picture data on the recording medium 20.

When the still-picture-taking button SW2 is depressed, the CPU 30 starts still-picture-taking processing. In still-picture-taking processing, exposure control is performed, a subject is imaged on the solid image pickup device (CCD) 44 through the picture-taking lens 12, and picture data when the still-picture-taking button SW2 is depressed is recorded as still picture data on the recording medium 20.

When both the moving-picture-taking button SW1 and the still-picture-taking button SW2 are operated to be in the on states, the CPU 30 records moving picture data obtained by photographing a subject with priority over still picture data on the recording medium 20.

Figure 3:
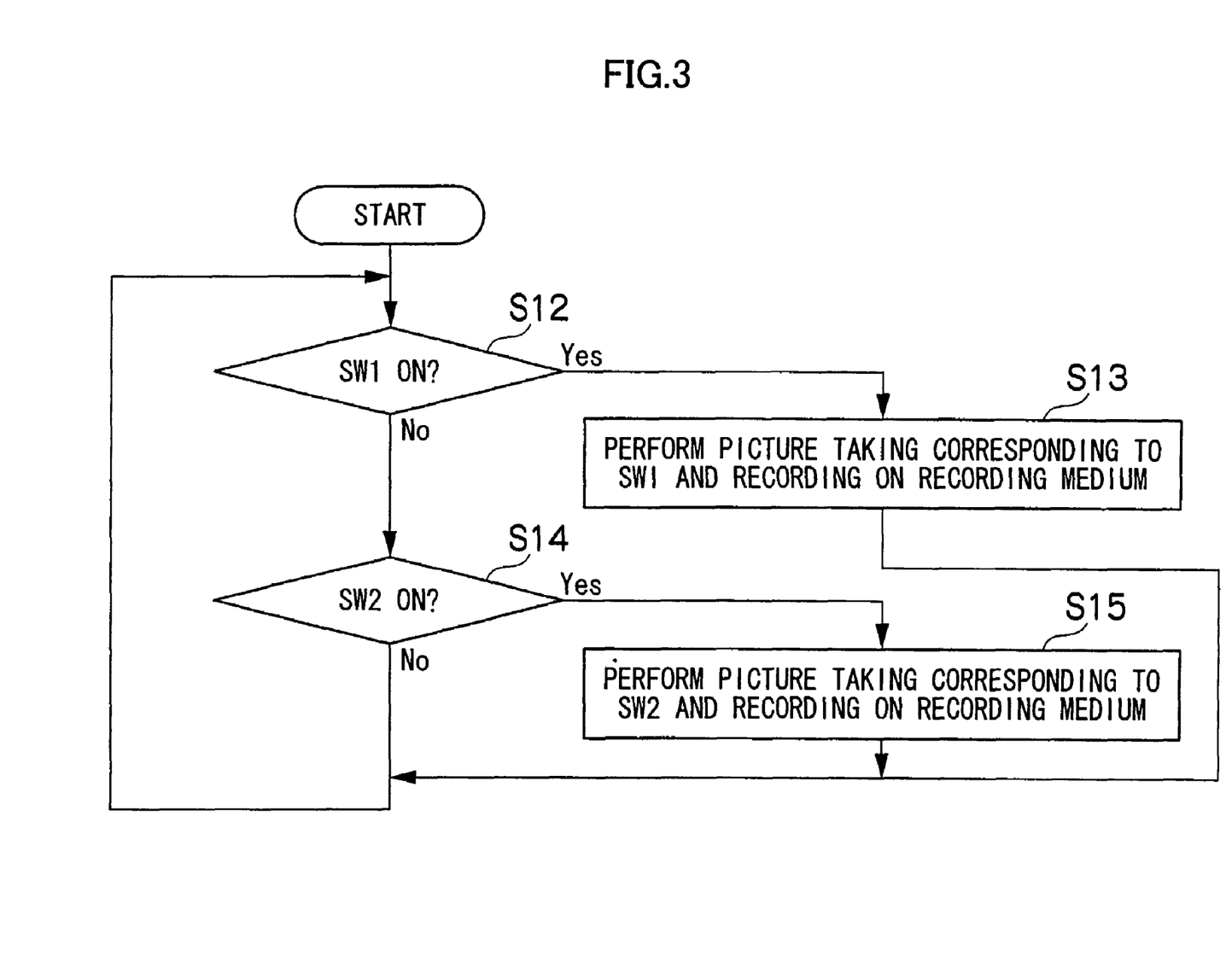
FIG. 3 is a flowchart showing an example of processing in the camera according to the first embodiment of the present invention.

FIG. 3 shows the outline of the flow of processing performed by the CPU 30 in this embodiment. Referring to FIG. 3, determination is first made as to whether the moving-picture-taking button SW1 is in the on state (S12). When the moving-picture-taking button SW1 is in the on state, moving picture data obtained by photographing a subject is recorded on the recording medium 20 by a medium control circuit 54 with priority over still picture data regardless of the state of the still-picture-taking button SW2 (S13). That is, as long as the on state of the moving-picture-taking button SW1 continues, moving picture data obtained by photographing the subject is continuously recorded on the recording medium 20 even when the still-picture-taking button SW2 is depressed. On the other hand, when the moving-picture-taking button SW1 is in the off state, determination is made as to whether the still-picture-taking button SW2 is in the on state (S14). If the still-picture-taking button SW2 is in the on state, still picture data obtained by photographing the subject is recorded on the recording medium 20 by the medium control circuit 54 (S15). That is, still picture data is recorded on the recording medium 20 only when the moving-picture-taking button SW1 and the still-picture-taking button SW2 are is in the off state and in the on state, respectively.

Processing performed in common for moving picture taking and still picture taking will be described with reference to FIG. 2.

In each of moving picture taking and still picture taking, the CCD 44 converts subject light imaged on its light receiving surface into signal charges according to quantities of light in the subject light. Signal charges thereby accumulated are successively read out as voltage signals corresponding to the signal charges. The voltage signals read out from the CCD 44 are supplied to a correlative double sampling circuit (CDS and AMP) 46, in which R, G and B signals corresponding to pixels are sampled and held and are amplified. The amplified R, G and B signals are supplied to the A/D converter 48. The A/D converter 48 converts the R, G and B signals sequentially supplied from the correlative double sampling circuit 46 into digital R, G and B signals and outputs these signals to an image signal processing circuit 50. The image signal processing circuit 50 performs predetermined kinds of image processing including concurrentization processing for converting the point-sequential R, G and B signals supplied from the A/D converter 48 into a concurrent equation, white balancing, gamma correction and YC signal processing. A luminance signal Y and color difference signals Cr and Cb (YC signals) produced by YC signal processing in the image signal processing circuit 50 are compressed in a predetermined format by a compression and expansion processing circuit 52 and are thereafter recording on the recording medium 20 through the medium control circuit 54.

An audio signal input from a microphone 61 at the time of moving picture taking and recording of an speech memo relating to a still picture undergoes processing including A/D conversion in an audio processing circuit 60. The audio signal thereby converted into a digital signal is compressed in a predetermined format by the compression and expansion processing circuit 52 and is thereafter recorded on the recording medium 20 through the medium control circuit 54 while being related to the picture data.

In the above-described camera according to the first embodiment of the present invention, the moving-picture-taking button SW1 and the still-picture-taking button SW2 are respectively provided in the front and rear surfaces of the camera body. Therefore, the operator can easily use selectively the moving-picture-taking button SW1 and the still-picture-taking button SW2, and occurrence of an erroneous operation can be prevented. Also, since the direction in which each button is operated is parallel to the optical axis of the picture-taking lens 12, camera shake caused by the operating force applied to the moving-picture-taking button SW1 or the still-picture-taking button SW2 is minimized and picture data free from fluctuation due to camera shake is recorded on the recording medium 20 according to an operator's intention.

Second Embodiment

Figure 4A:
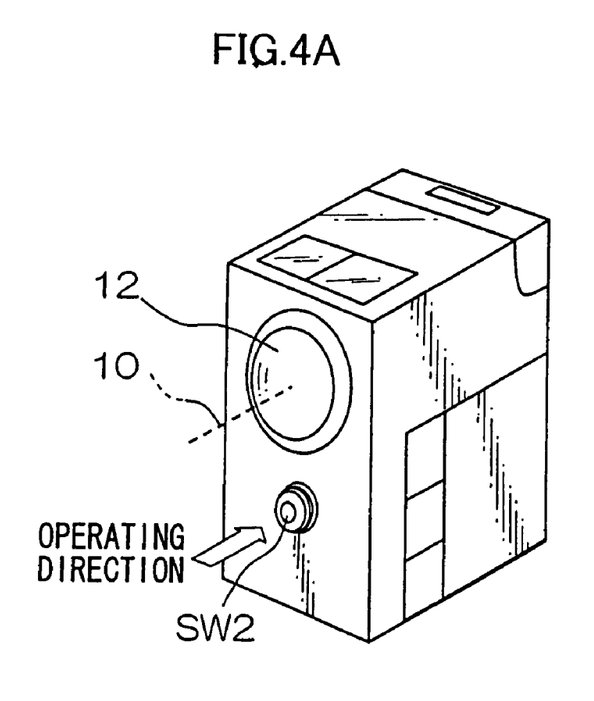
FIG. 4A is a front perspective view of a camera which represents a second embodiment of the present invention.
Figure 4B:
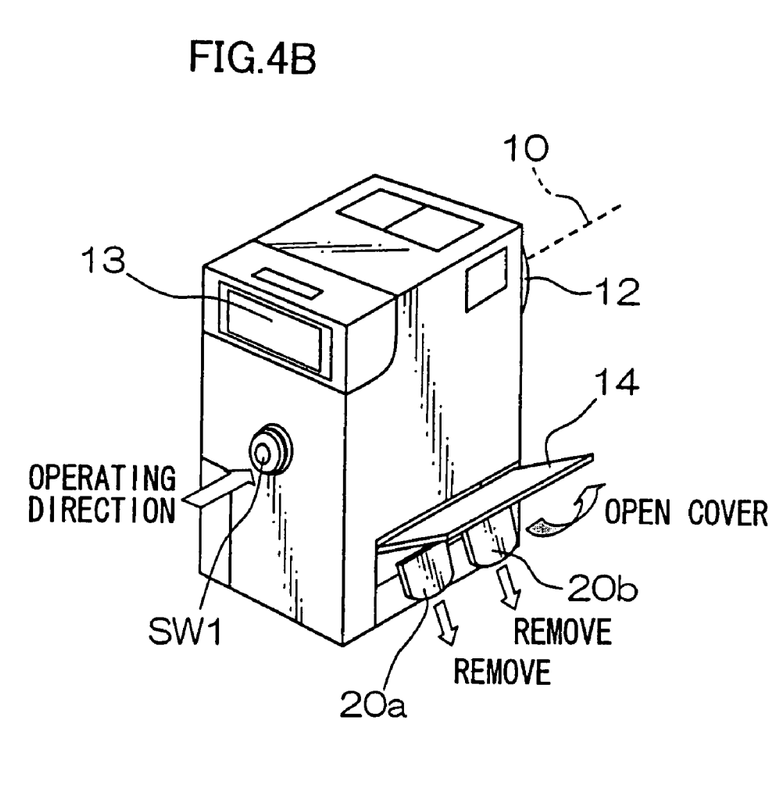
FIG. 4B is a rear perspective view of the camera according to the second embodiment of the present invention.
Figure 5:
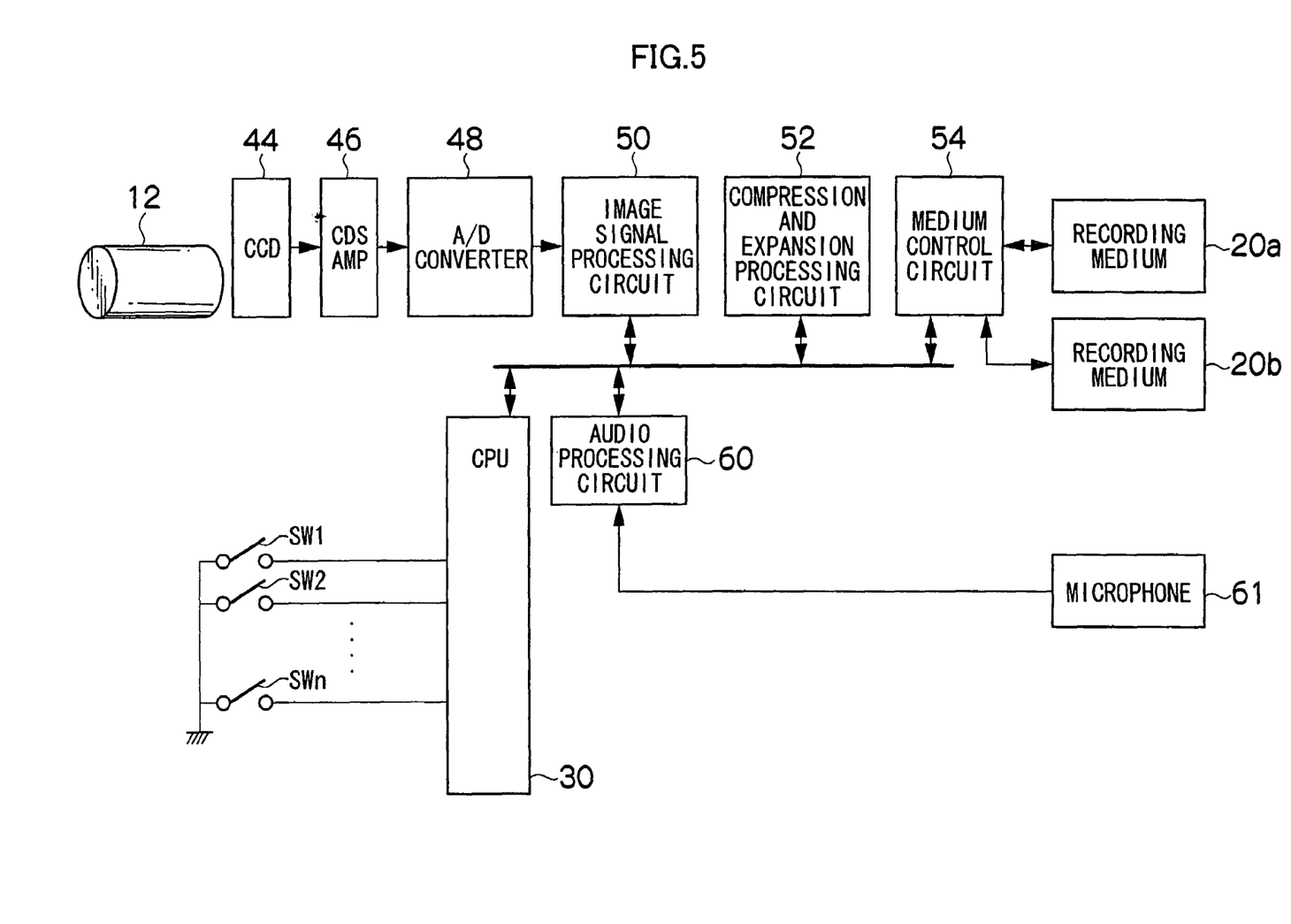
FIG. 5 is a block diagram showing essential portions of the internal configuration of the camera according to the second embodiment of the present invention.

FIG. 4A is a front perspective view of a camera which represents a second embodiment of the present invention, and FIG. 4B is a rear perspective view of the camera. FIG. 5 is a block diagram showing essential portions of the internal configuration of the camera. The same portions as those in the first embodiment shown in FIGS. 1 and 2 are indicated by the same reference characters.

In the camera of this embodiment, a plurality of recording mediums 20a and 20b can be detachably attached to the camera independently of each other. More specifically, each of recording mediums 20a and 20b can be removed from the camera after opening a cover 14, as shown in FIG. 4B.

Description will be made by assuming that each of the first recording medium 20a and the second recording medium 20b is a memory card, moving picture data is recorded on the first recording medium 20a, and still picture data is recorded on the second recording medium 20b. In actuality, mediums different from each other may be used the recording mediums 20a and 20b. Alternatively, the recording mediums 20a and 20b are mediums of the same kind having different capacities. In actuality, the recording mediums 20a and 20b are used in various ways in relation to each other. Data may be distributed under the control of the CPU 30 in such a manner that picture data obtained by picture taking is recorded on the first recording medium 20a while audio data obtained by collecting sound with the microphone 61 is recorded on the second recording medium 20b. Various uses of the recording mediums 20a and 20b including those described above can be set through the operations of the other switches SWn.

In this embodiment, the CPU 30 simultaneously records images of one subject on the first recording medium 20a and the second recording medium 20b when both the moving-picture-taking button SW1 and the still-picture-taking button SW2 are operated to be in the on states. More specifically, moving picture data obtained by photographing a subject is recorded on the first recording medium 20a, and still picture data obtained from the same subject as that from which the moving picture data is obtained is recorded on the second recording medium 20b. When the still-picture-taking button SW2 is operated during recording of moving picture data performed by operating the moving-picture-taking button SW1, still picture data on the same subject is recorded on the second recording medium 20b while recording of the moving picture data on the first recording medium 20a is continued. The resolutions of moving picture data and still picture data respectively recorded on the recording mediums 20a and 20b may be different from each other. For example, still picture data can be recorded at a resolution higher than that at which moving picture data is recorded.

Figure 6:
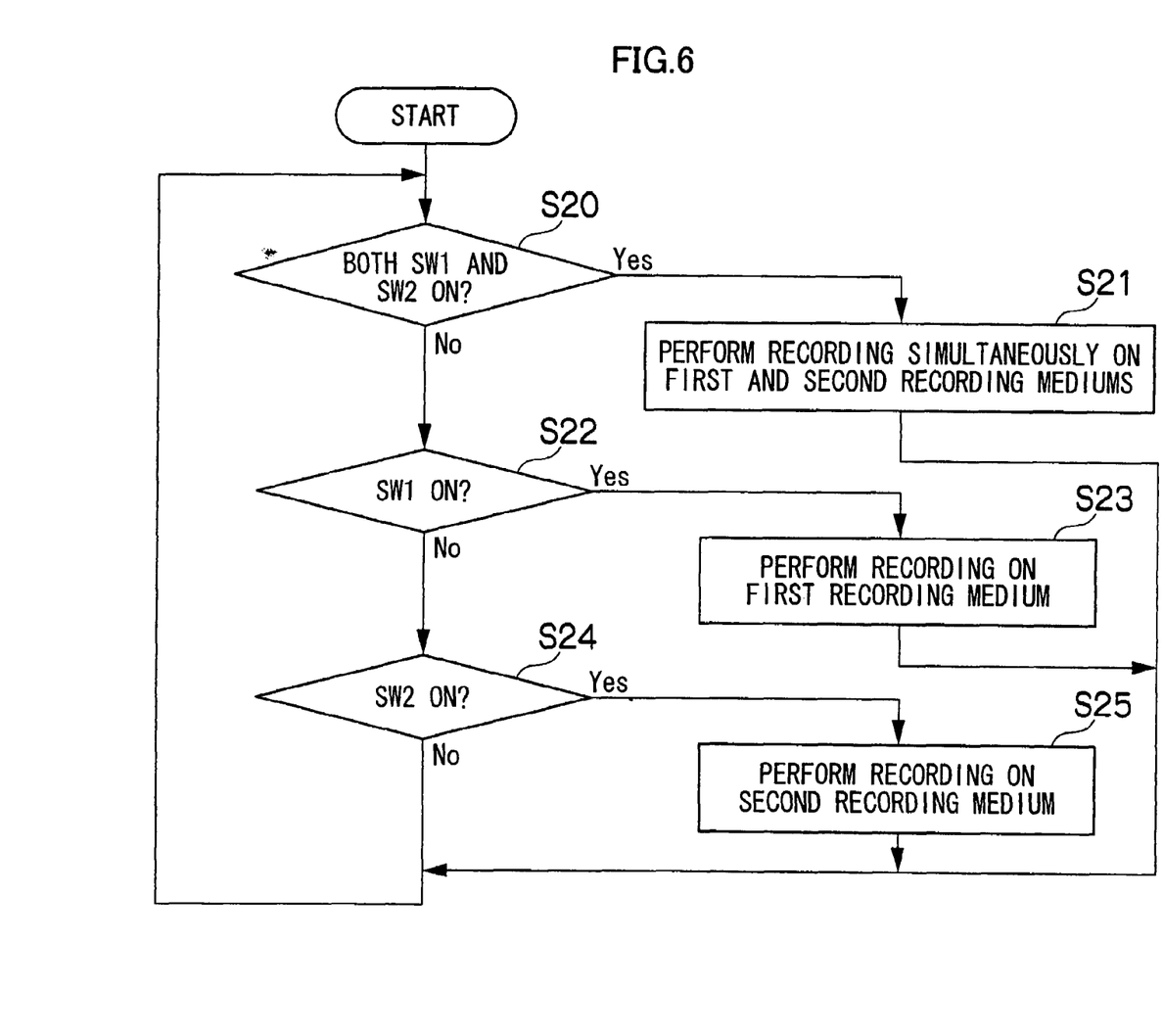
FIG. 6 is a flowchart showing an example of processing in the camera according to the second embodiment of the present invention.

FIG. 6 shows the outline of the flow of processing performed by the CPU 30 in this embodiment.

Referring to FIG. 6, determination is first made as to whether both the moving-picture-taking button SW1 and the still-picture-taking button SW2 are in the on states (S20). When both the moving-picture-taking button SW1 and the still-picture-taking button SW2 are in the on states, the medium control circuit 54 is controlled so that moving picture data obtained by photographing a subject is recorded on the first recording medium 20a and still picture data on the same subject is recorded on the second recording medium 20b (S21). Determination is also made as to whether only the moving-picture-taking button SW1 is in the on state or not (S22). When only the moving-picture-taking button SW1 is in the on state, the medium control circuit 54 is controlled so that only recording of moving picture data on the first recording medium 20a is performed (S23). Also, determination is made as to whether only the still-picture-taking button SW2 is in the on state or not (S24). When only the still-picture-taking button SW2 is in the on state, the medium control circuit 54 is controlled so that only recording of still picture data on the second recording medium 20b is performed (S25).

In the above-described camera according to the second embodiment of the present invention, the moving-picture-taking button SW1 and the still-picture-taking button SW2 are respectively provided in the front and rear surfaces of the camera body, as are those in the first embodiment. Therefore, the operator can easily select and use the moving-picture-taking button SW1 and the still-picture-taking button SW2, and occurrence of an erroneous operation can be prevented. Also, moving picture data corresponding to the moving-picture-taking button SW1 is recorded on the first recording medium 20a and still picture data corresponding to the still-picture-taking button SW2 is recorded on the second recording medium 20b. Thus, picture data is distributed to the recording mediums respectively corresponding to the picture-taking operating devices according to an operator's intention. Even in a case where still picture taking is performed along with moving picture taking, the second recording medium 20b on which only still picture data is recorded can be delivered to a photographic printer. Since the direction in which each button is operated is parallel to the optical axis of the picture-taking lens 12 as in the first embodiment, camera shake caused by the operating force applied to the moving-picture-taking button SW1 or the still-picture-taking button SW2 is minimized and picture data free from fluctuation due to camera shake is recorded on each of the recording mediums 20a and 20b according to an operator's intention.

The first and second embodiments have been described by way of example with respect to a case where the picture-taking operating devices operated for picture taking are a moving-picture-taking button and a still-picture-taking button. However, the present invention is not limited to this. The present invention can be applied to any other picture-taking operating devices to input instructions to perform different picture-taking operations. For example, a first picture-taking button operated each time a frame of still image is taken and a second picture-taking button operated when a plurality of frames of still image are successively taken (ordinarily called "continuous shooting button") may be provided in the front and rear surfaces of the camera body.

While the embodiments have been described by way of example with respect to a case where the picture-taking operating devices are buttons, any other picture-taking operating devices such as levers may alternatively be used.

While the second embodiment has been described by way of example with respect to a case where the two recording mediums 20a and 20b are memory cards, one of the recording mediums 20a and 20b may be a magnetic tape.

While the embodiments have been described by way of example with respect to a digital camera, the present invention can also be applied to a silver-salt camera.

What is claimed is:

1. A camera comprising:
    a picture-taking lens for photographing a subject; and
    a first picture-taking operating device and a second picture-taking operating device operated to input instructions to perform different picture-taking operations,
    wherein said first picture-taking operating device is placed in a rear surface of a camera body; said second picture-taking operating device is placed in a front surface of the camera body; and each of said first and second picture-taking operating devices is provided so that its operating direction is parallel to the optical axis of said picture-taking lens,
    wherein one of said first and second picture-taking operating devices is a moving-picture-taking button depressed at the time of moving picture taking; the other of said first and second picture-taking operating devices is a still-picture-taking button depressed at the time of still picture taking; and each of said moving-picture-taking button and said still-picture-taking button is provided so that the direction in which the button is depressed is parallel to the optical axis of said picture-taking lens, and
    wherein when both said moving-picture-taking button and said still-picture-taking button are operated to be simultaneously in the on states, moving picture data obtained by photographing the subject is recording on a predetermined recording medium with priority over still picture data.

* * * * *